Figure 6:
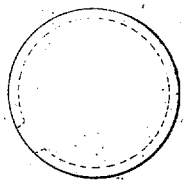

2 Sheets—Sheet 1.

J. J. SQUIRE.

Assignor by mesne assigments to H. E. Towle.

REGISTER FOR GAS AND WATER METERS.

No. 7,601. Reissued April 10, 1877

Witnesses

W. Gardner.

Alexander Scott

Inventor

J. J. Squire per

Hamilton E. Towle

Atty

2 Sheets—Sheet 2.

J. J. SQUIRE.

Assignor by mesne assigments to H. E. Towle.

REGISTER FOR GAS AND WATER METERS.

No. 7,601. Reissued April 10, 1877.

Witnesses:

W. Gardner,

Alexander Scott,

Inventor:

J. J. Squire, per

Hamilton E. Towle

" " Atty.

UNITED STATES PATENT OFFICE.

JOHN J. SQUIRE, OF ST. LOUIS, MO., ASSIGNOR, BY MESNE ASSIGNMENTS, TO HAMILTON E. TOWLE, OF NEW YORK CITY.

IMPROVEMENT IN REGISTERS FOR GAS AND WATER METERS.

Specification forming part of Letters Patent No. 37,832, dated March 3, 1863; reissue No. 7,601, dated April 10, 1877; application filed October 3, 1876.

*To all whom it may concern:*

Be it known that I, JOHN J. SQUIRE, of St. Louis, city and county of St. Louis, Missouri, have invented certain new and useful Improvements in Registers for Gas and Water Meters, &c.; and I do hereby declare that the following is a full, clear, and exact description thereof, reference being had to the accompanying drawings.

My invention has for its object the indication and exhibition of figures and numbers in recording or registering machines, plainly and without confusion, and in such a manner as to avoid errors or mistakes by the observer in ascertaining or in taking off the indication of the meter or register, so that accuracy, facility, and reliability may obtain.

It consists of the combination of one or more movable plates, disks, dials, or screens with another plate, disk, dial, or screen (or with more than one other, if so desired) with the works or movements of the meter or registering mechanism actuating said plate, disk, dial, or screen, the connections between the part being such as operate the plate, disk, dial, or screen, or more than one of them, to expose or obscure at the proper time such figures, letters, or numbers of the register as will truthfully show and leave exposed the desired letters, figures, or amounts, and at the same time cover up or obscure such others as would otherwise tend to create confusion, doubt, or delay in learning the state of the register.

Furthermore, it has for its object the indication and exhibition of numbers and figures, in recording and registering machines, plainly and without confusion, and in such a manner as to avoid errors or mistakes by the observer in ascertaining or in taking off the indications of the meter or register, so that every possible accuracy, facility, and reliability may obtain.

It consists of the combination of one or more movable plates, disks, dials, or screens with another plate, disk, dial, or screen (or with more than one other, if so desired) with the works or movements of the meter or registering mechanism actuating the said plate, disk, dial, or screen, the connections between the parts being such as to operate the plate, disk, or dial as a screen to expose or obscure at the proper time such characters, figures, or numbers of the register as will truthfully show and leave exposed the desired characters, figures, numbers, or amounts, and at the same time cover up or keep obscured such others as would, if exposed, tend to create confusion, doubt, or delay in learning the state of the register.

Figure 2:
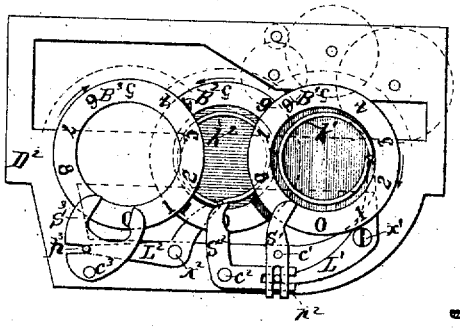
Figure 4:
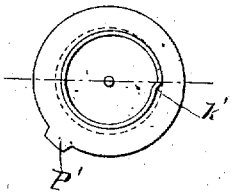
Figure 5:
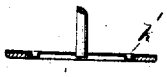
Figure 3:
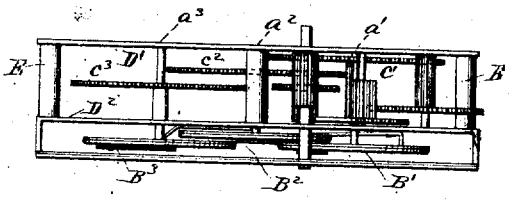
Figure 1:
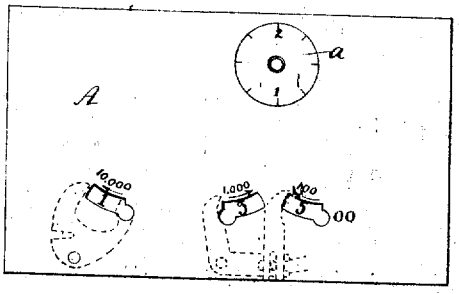
Figure 7:
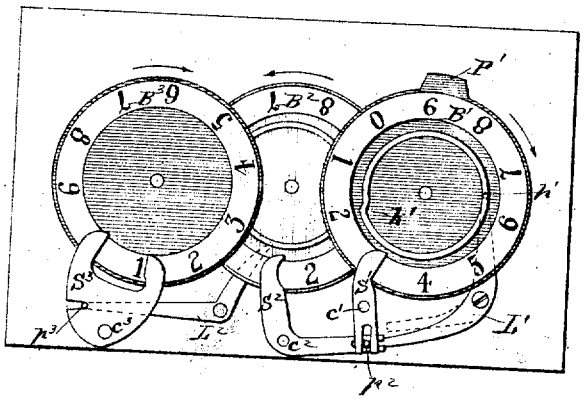

Figure 1 of the drawings is a front elevation of the front of the register or meter. A is the face-plate. Fig. 2 is a front elevation of the registering appararus with face-plate removed; also showing more interior parts, viz., unit-disk $B^1$, ten-disk $B^2$, &c. Fig. 3 is a top view or plan. Fig. 4 is a plan, and Fig. 5 is a cross-sectional view of revolving dial $B^1$, showing cam-groove $k'$ on the same. Fig. 6 shows, in plan, a blank disk or screen ready to be cut away to form any desired shape of screen or disk, as, for example, that indicated by the dotted line in this figure, and shown finished with the projection $P'$ and re-entering angles on each side of the projection in Fig. 4. Fig. 7 is an enlarged view of the dials and revolving disks or revolving screens $P'$ $B^1$ $B^2$ $B^3$, and the swinging or oscillating screens $S^1$ $S^2$ $S^3$, centered at $c^1$ $c^2$ $c^3$, and operated through the connection $p^2$ $p^3$ on the levers $L^1$ $L^2$, driven to act at the proper time by the cams $k^1$ $k^2$, carried by the shafts of the disks and dials $B^1$ $B^2$.

The fixed plate or face A has openings, showing through them the position or indications of the dials $B^1$ $B^2$ $B^3$, which, in Fig. 1, are 1 5 5. The dials are graduated decimally and marked zero (0) to nine (9), inclusive, as is well known in many kinds of counting-machines in common use.

The visual openings in the face-plate A are or may be each large enough to show two figures on the dial below or behind it, and to allow the figure just appearing to remain in full view during the part of a revolution due to the division between it and the next figure in order.

Figure 8:
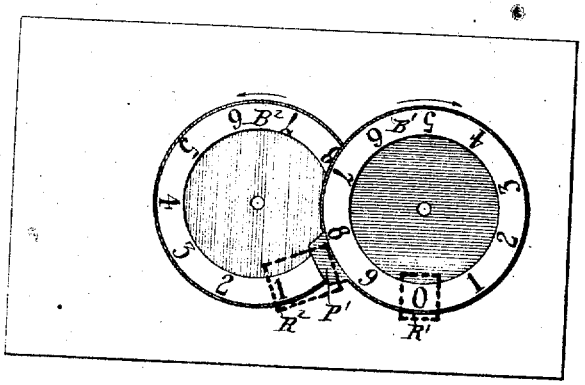

To avoid the danger of taking off the wrong figure when noting the state of the register, especially if more than one figure is wholly or partly visible through the opening, I have arranged movable screens or swinging plates in such a manner and so operated by or with the movements of the figure-bearing disk as to cover up and obscure such figures as are not desired to be seen or required to ascertain the state of the register at any time. Such screen or swinging plate is shown at $S^1$ $S^2$ $S^3$, centered outside of the circumference of the dials bearing the figures of the register; and in Figs. 2, 7, and 8 the screen is formed of a part of the disk or dial-plate itself, and swings upon the same center, as shown in dial $B^1$. In fact the dial-plate serves both purposes, namely, to carry the figures or characters belonging to it, and also to serve as a shield, guard, or screen in respect to other figures over which it moves and covers up, or exposes to view, in accordance with the shape given to it, and its motion in respect to the position of characters upon the plate or parts beneath or behind it. How this is accomplished in the simple combination of two revolving disks bearing figures for counting or adding is shown in Fig. 8, in which $B^1$ $B^2$ are the revolving wheels, disks, or plates bearing numbers. These wheels are driven simultaneously—for example, $B^1$ moves ten revolutions to one revolution of $B^2$. $B^2$ then runs one-tenth of a revolution, while $B^1$ makes a full revolution. The figures on $B^2$ then show the number of revolutions made by $B^1$, and such figures as are visible on $B^2$ are only to be seen through the opening in the covering face-plate A. (Removed in Figs. 2, 7, and 8.) The position of such openings as are provided for viewing the indications of dials $B^1$ and $B^2$ are shown by the dotted rectangular areas marked $R^1$ and $R^2$.

In Fig. 8, dial $B^1$ is shown as just having completed its first revolution, counting thereby ten, which is now to appear on the tens-dial $B^2$ as 1 in the opening $R^2$, but at the instant of transferring the registration from the unit-wheel $B^1$ to the tens-wheel $B^2$ it is necessary to simultaneously obscure the zero (0) on $B^2$ and expose the figure 1 on the same dial, and this is accomplished by the presentation of the part $P'$ of the disk $B^1$ directly over the figure to be hidden, and at the same time a shield which obscured beneath it the figure 1 on dial $B^2$ is withdrawn, substantially as shown and explained.

Fig. 7 shows the arrangement or application of both swinging shield or guard-plates $S^1$ $S^2$ $S^3$, and also the application of a dial itself in such a manner as to make it serve for the similar purposes, in which disk $P'$ is the part cut or shaped to serve as a guard or screen; but this application can be employed only when the revolving disks overlap each other in some degree. When they do not overlap, the system shown at $S^1$ $S^2$ $S^3$ can readily be applied by any one skilled in the art.

What I claim as my invention, and desire to secure by Letters Patent, is—

1. In a registering mechanism, a revolving disk, in combination with another disk having numerical characters upon it, the first disk serving at one point in its revolution to obscure for the time being the number upon the second disk which would otherwise be exposed, substantially as set forth.

2. The arrangement, substantially as shown and described, of cams, levers, and shields, for the purposes set forth.

3. In a registering apparatus, the combination of a units-disk overlapping a part of a tens-disk with the said tens-disk, the said units-disk having parts of it cut away so as to allow characters or numbers upon the said tens-disk to be seen and read at a designated place or visual opening at which the state of the register is to be ascertained, substantially as set forth.

4. Registering mechanism, composed of a unit-disk and a ten-disk, geared to work together by ratchet-wheel and pinion, said unit-wheel being cut away or mutilated at or near its periphery in such a manner as to allow numerical characters upon the ten-disk to be seen at the cut-away or mutilated places through suitable openings in an exterior cover plate, substantially as set forth.

5. In combination with a registering apparatus, consisting of one or more wheels showing numbers upon the same, a shield or screen centered and pivoted in such a manner as to allow the screen or shield to be shifted to cover or uncover numbers as the registration or indications proceed, substantially as shown and described.

Dated and signed this 2d day of September, 1876.

JOHN J. SQUIRE.

Witnesses:

D. R. MYERS, Jr.,

SAMUEL E. CAVIN.